May 9, 1944.   R. F. MALLINA   2,348,352
ALTERNATING CURRENT GENERATOR
Filed May 21, 1941

INVENTOR
R. F. MALLINA
BY
ATTORNEY

Patented May 9, 1944

2,348,352

UNITED STATES PATENT OFFICE 2,348,352

ALTERNATING CURRENT GENERATOR

Rudolph F. Mallina, Hastings on Hudson, N. Y., assignor to Bell Telephone Laboratories, Incorporated, New York, N. Y., a corporation of New York Application May 21, 1941, Serial No. 394,466

2 Claims. (Cl. 179—90)

This invention relates to signaling means and particularly to alternating current generators of the type used in telephones for generating alternating current dialing signals representing telephone station designations.

The object of the invention is to provide a simple and efficient alternating current generator of small dimensions. The device of the present invention belongs in that class of generators used in communication systems for signaling by voice frequency alternating currents. Generally speaking, these generators comprise interlinked magnetic and electric circuits operated by a plucked reed designed to have a particular natural period of vibration corresponding to the frequency of the alternating current needed for signal purposes. When the reed is plucked it will vibrate at a sufficient amplitude over a period sufficient to produce an effective signal. In such generators it is usual to employ a plurality of such reeds each of a different dimension whereby a plurality of alternating currents of different frequencies may be generated and which may be transmitted either singly or in combination and in permutation codes representing different telephone designations.

It is the object of the present invention to employ magnetostriction means rather than electromagnetic means to translate the movements of the reeds into the desired alternating current signals. Magnetostriction may be defined as a change in the dimensions of a body caused by magnetism. The effect is reversible, that is, if the dimensions of a body are changed a magnetic change will occur. A body which will vibrate through change in dimensions when alternating current is passed through a magnetizing coil will cause alternating current to be generated in the coil when it is vibrated in such manner that its dimensions are changed.

Accordingly the generator of the present invention consists of a pick-up coil associated with an element whose dimensions may be changed at a given rate corresponding to the frequency of the alternating current signal desired.

A feature of the invention is a generator in which a magnetostriction element is driven by a reed.

Another feature of the invention is a generator in which a magnetostriction element is driven by a plurality of reeds which may be selectively plucked.

Still another feature is a generator in which the magnetostriction element is itself in the form of a reed which may be set into vibration by external mechanical means.

Another feature is a generator in which a magnetostriction element is in the form of a mechancial transformer which may be operated to change the dimensions of the elements thereof when actuated by a vibrating reed.

Other features will appear in the following description.

The drawing consists of a single sheet having five figures as follows.

Patent 2,147,710 granted February 21, 1939, to R. F. Mallina shows a telephone circuit apparatus in which an alternating current generator capable of producing a plurality of currents of different frequencies is incorporated. This generator acts upon the electromagnetic principle and is operated by a number of digit keys which will pluck the reeds of the generator in different combinations.

Figure 1:
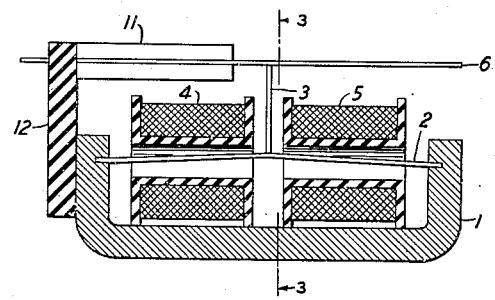
Fig. 1 is a cross-sectional view taken through one of the reeds of the generator to aid in the explanation of the means by which alternating currents are generated.

The alternating current generator of the present invention is intended for the same purpose but operates on a different principle, that known as magnetostriction. Essentially this is accomplished by means of a rigid anchorage, in the form of a U-shaped permanent magnet as shown in Fig. 1. Extending from one pole to the other of this permanent magnet is a magnetostriction element 2 of magnetic material. This is slightly longer than the distance between its points of anchorage in the permanent magnet 1. Therefore, if it is forced downwardly by link 3 the two portions of the elements 2 will be put under compression due to the action of the mechanical transformer or mechanical linkage thereof. The material being put under compression, through the principle of magnetostriction, will affect the coils 4 and 5 and cause a current to be induced therein. If the element 2 is caused to vibrate through the vibration of a reed 6, being communicated thereto by the link 3, then an alternating current of the same frequency as the natural period of vibration of the reed 6 will be induced in the coils 4 and 5 and may be delivered to the terminals of the generator as an alternating current of the desired frequency.

Figure 2:
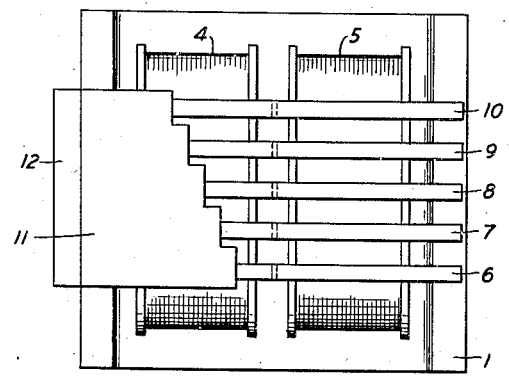
Fig. 2 is a top view of the generator showing five reeds of different lengths.
Figure 3:
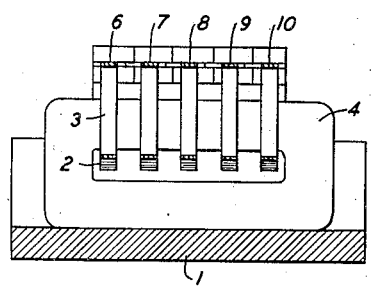
Fig. 3 is an end view of the same device.

Fig. 2 shows a plurality of reeds, 6, 7, 8, 9 and 10, each of a different length and, therefore, each having a different natural period of vibration. Each reed has a link such as the link 3 extending to an individual magnetostriction element threading the coils 4 and 5 and hence the terminals of the generator connected to these coils will act to transmit different frequency currents each corresponding to the natural period of vibration of the various reeds.

The reeds are anchored to a common base 11 and the relationship between the reeds and the magnetostriction elements is preserved in any desired manner, here indicated by the piece of insulation 12 to which both the magnet 1 and the reed anchorage 11 are secured.

Figure 4:
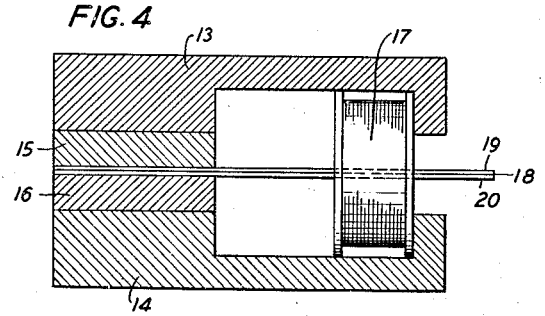
Fig. 4 is a cross-sectional view of a generator in which the reed itself is in the form of a magnetostriction element which is plucked like other reeds in this type of generator.

In Fig. 4 another form of the invention is illustrated. This takes the conventional form of the alternating current generators used in these telephone substation handset cradles illustrated in the above-noted Mallina patent. Two permanent magnets 13 and 14 are provided but in this case and differing from previous devices of this nature a large non-magnetic gap is formed by the spacers 15 and 16. The usual type of pickup coil 17 is provided and is effectively wound about the five reeds, each of a different length, whereby they are each tuned to a different natural period of vibration. One of these reeds 18 is shown in this cross-sectional view. The reed is made of two strips of dissimilar metal welded or otherwise secured together as indicated by the two strips 19 and 20. The plucking of the reed may be accomplished in the same general way as that indicated in the Mallina patent. The action is here the reverse of the action of known magnetostrictive vibrators such, for instance, as that shown in Patent 1,882,397, granted October 11, 1932, to G. W. Pierce. Through the mechanical vibration of the reed 18 an alternating current of like frequency will be induced by the principle of magnetostriction in the coil 17.

Figure 5:
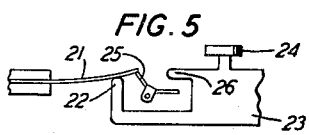
Fig. 5 is a schematic diagram of a reed plucking mechanism.

Fig. 5 is a schematic showing of a reed plucking mechanism. The reed 21 is normally stressed upwardly by the finger 22 of the key bar 23, by a spring not shown. When the key 24 is depressed the finger 22 frees the reed 21 but the reed is then held by the pawl member 25. When the key bar 23 is further depressed the finger 26 of the bar 23 engages the pawl member 25 and by turning it in a clockwise direction frees the reed with a snap thus allowing it to freely vibrate.

It is intended that this specification will cover other modifications of this device which come within the spirit of this invention and the scope of the following claims.

What is claimed is:

1. An alternating current generator comprising a plurality of magnetostriction elements, each consisting of a pair of bars joined at one end of each at a knee and solidly secured at the other end of each, a plurality of reeds each tuned to a given different frequency, a link between each of said reeds and one of said knees whereby the forces of compression and tension are alternately applied to said bars through the vibrations of said reeds communicated through said links, and a coil wound about said bars for translating the resulting changes in magnetism of all of said bars into alternating current.

2. An alternating current generator comprising a plurality of magnetostriction elements, each consisting of a pair of bars joined at one end of each at a knee and solidly secured at the other end of each, a plurality of similar reeds anchored at one end to a common base in such a manner that they have different natural periods of vibration, a link between each of said reeds and one of said knees whereby the forces of compression and tension are alternately applied to said bars through the vibrations of said reeds communicated through said links, and a coil wound about said bars for translating the resulting changes in magnetism of all of said bars into alternating current.

RUDOLPH F. MALLINA.